US012711631B2

(12) United States Patent
Pillai et al.

(10) Patent No.: US 12,711,631 B2
(45) Date of Patent: Aug. 18, 2026

(54) SYSTEMS AND METHODS FOR DETERMINING SEMANTIC SEGMENTATION OF REAL-WORLD OBJECTS

(71) Applicant: Dassault Systemes Americas Corp., Waltham, MA (US)

(72) Inventors: Mayaank Pillai, Hillsborough, NJ (US); Kwan Skinner, Mesa, AZ (US); Lalitha Subramanian, Newtown, PA (US)

(73) Assignee: Dassault Systemes Americas Corp., Waltham, MA (US)

( * ) Notice: Subject to any disclaimer, the term of this patent is extended or adjusted under 35 U.S.C. 154(b) by 216 days.

(21) Appl. No.: 18/661,048

(22) Filed: May 10, 2024

(65) Prior Publication Data

US 2025/0349014 A1 Nov. 13, 2025

(51) Int. Cl.
*G06T 7/12* (2017.01)
*G06V 10/25* (2022.01)

(52) U.S. Cl.
CPC ................ *G06T 7/12* (2017.01); *G06V 10/25* (2022.01); *G06T 2207/20081* (2013.01); *G06T 2207/20084* (2013.01)

(58) Field of Classification Search
CPC ............. G06T 7/12; G06T 2207/20081; G06T 2207/20084; G06T 2207/10081; G06T 7/11; G06T 3/4046; G06T 5/60; G06T 9/002; G06T 2207/20076; G06T 2211/441; G06T 7/194; G06T 2219/004; G06T 7/10; G06T 5/75; G06T 7/168; G06T 17/00;

(Continued)

(56) References Cited

U.S. PATENT DOCUMENTS

| | | | | |
|---|---|---|---|---|
| 12,614,284 B2 * | 4/2026 | Lan | ........................... | G06T 1/20 |
| 2023/0251620 A1 * | 8/2023 | Apte | ..................... | G06F 30/398 700/121 |

(Continued)

FOREIGN PATENT DOCUMENTS

| | | | | |
|---|---|---|---|---|
| CN | 117710381 A * | 3/2024 | ............... | G06N 3/08 |
| KR | 20240039368 A * | 3/2024 | ..... | G01R 31/318307 |
| WO | WO-2023156319 A1 * | 8/2023 | ........... | G06V 10/774 |

OTHER PUBLICATIONS

PCT/US23/35542 specification (Oct. 19, 2023). (Year: 2023).*

(Continued)

*Primary Examiner* — Jose L Couso

(74) *Attorney, Agent, or Firm* — Hamilton, Brook, Smith & Reynolds, P.C.

(57) ABSTRACT

Embodiments determine semantic segmentation of real-world objects. One such embodiment obtains an image of a real-world object. The obtained image is processed using a plurality of vision transformer (ViT) models to generate a plurality of segmentation masks. Each ViT model is configured to output a respective segmentation mask corresponding to a respective target material. Using a neural network combiner model, a multiphase semantic segmentation mask is generated based on the plurality of segmentation masks. The neural network combiner model is trained to integrate outputs of the plurality of ViT models. Semantic segmentation of the real-world object is thereby determined.

20 Claims, 7 Drawing Sheets

(58) Field of Classification Search

CPC ......... G06T 19/003; G06T 2207/30242; G06T 2207/30024; G06T 7/344; G06V 10/25; G06V 10/809; G06V 10/26; G06V 10/764; G06V 10/82; G06V 10/454; G06V 10/54; G06V 10/7764; G06V 10/774; G06V 10/84; G06V 20/41; G06V 30/18057; G06V 20/698; G06V 30/19173; G06V 30/194; G06V 20/64; G06V 20/647; G06V 20/70; G06V 30/274; G06V 2201/03; G06N 3/02; G06N 3/08–088; G06N 3/04; G06N 3/0445; G06N 3/0454; G06N 3/0464; G06N 3/4046; G06N 3/4053; G06N 3/049; G06N 3/0499; G06N 7/00; G06N 7/01; G06N 20/00; G06K 7/1482; G06F 18/213; G06F 18/214; G06F 18/22; G06F 18/241; G06F 18/24; G06F 18/2411; G06F 18/2415; G06F 18/253; G06F 30/27; G06F 16/583; G06F 16/5854; G06F 18/2113; Y10S 128/925; G01N 1/30; G01N 2001/302; G16H 30/20; G16H 30/40; G16H 50/20

See application file for complete search history.

(56) References Cited

U.S. PATENT DOCUMENTS

| | | | | |
|---|---|---|---|---|
| 2025/0244261 | A1* | 7/2025 | Bastian | G06T 7/60 |
| 2025/0308268 | A1* | 10/2025 | Madhumani | G06V 10/26 |
| 2025/0322528 | A1* | 10/2025 | Gu | G06T 7/11 |

OTHER PUBLICATIONS

PCT/US23/35542 drawings (Oct. 19, 2023). (Year: 2023).*

Choudhary et al., "Recent advances and applications of deep learning methods in materials science", Mesoscale and Nanoscale Physics, vol. 8, No. 1, Apr. 2022, 26 pages.

Wang et al., "Transformer-based automated segmentation of recycling materials for semantic understanding in construction", Automation in Construction, vol. 154, Jun. 17, 2023, 13 pages.

Boeck, H., "GitHub—hendrikboeck/simple-ct-sim," Apr. 30, 2024, 4 pages, https://github.com/hendrikboeck/simple-ct-sim.

Kirillov, A., et al., "Segment Anything," Proceedings of the IEEE/CVF International Conference on Computer Vision, Apr. 2023, pp. 4015-4026.

Lu et al., "3D microstructure design of lithium-ion battery electrodes assisted by X-ray nano-computed tomography and modelling", Nature Communications, vol. 11, No. 2079, Apr. 2020, pp. 1-13.

Muller et al., "Deep learning-based segmentation of lithium-ion battery microstructures enhanced by artificially generated electrodes", Nature Communications, vol. 12, No. 6205, Oct. 2021, pp. 1-12.

Su et al., "Artificial neural network approach for multiphase segmentation of battery electrode nano-CT images", npj Computational Materials, vol. 8, No. 30, Feb. 2022, pp. 1-11.

Van Aarle et al., "Fast and flexible X-ray tomography using the ASTRA toolbox", Optics Express, vol. 24, No. 22, Oct. 2016, pp. 25129-25147.

Van Aarle et al., "The ASTRA Toolbox: a platform for advanced algorithm development in electron tomography", Ultramicroscopy, vol. 157, Oct. 2015, pp. 35-47.

Wang et al., "Self-Augmentation with Dual-Cycle Constraint for Unsupervised Image-to-Image Generation," 2021 IEEE 33rd International Conference on Tools with Artificial Intelligence (ICTAI), Nov. 2021, pp. 886-890.

Wu et al., "Medical SAM Adapter: Adapting Segment Anything Model for Medical Image Segmentation", arXiv preprint, Dec. 2023, 10 pages.

* cited by examiner

330

440

SYSTEMS AND METHODS FOR DETERMINING SEMANTIC SEGMENTATION OF REAL-WORLD OBJECTS

BACKGROUND

Semantic segmentation is a process of identifying material(s) that make up objects. Several existing semantic segmentation methodologies rely on computer vision techniques.

SUMMARY

Problematically, existing computer vision techniques for semantic segmentation often produce inconsistent and inaccurate results. For instance, existing approaches produce poor results when applied to porous, amorphous, irregular, and/or low-contrast materials in electrodes, such as carbon black-binder (CBD), among other examples. Conventional methods also typically depend on the availability of a large amount of annotated training data. Therefore, functionality with improved accuracy, consistency, and efficiency for determining semantic segmentation of real-world objects, e.g., electrodes, is needed. Embodiments provide such functionality.

Embodiments for determining semantic segmentation of real-world objects may apply deep learning techniques to, e.g., electrode analysis and/or development. However, it is noted that embodiments are not limited to electrode analysis and, instead, embodiments can be applied to any multiphase semantic segmentation problem, including where an existing amount of labeled training data is available. In other words, embodiments can be used to determine a composition and/or structure of materials and/or minerals scanned or imaged in a two-dimensional (2D) or three-dimensional (3D) manner. An example embodiment may leverage a large amount of labeled training examples, where materials present may be highlighted by an expert, for tuning model(s), e.g., transformer and/or combiner model(s). Other example applications of embodiments include medical imaging (e.g., radiology), identifying cell growth in a sample, and research and development of other composite materials.

It should be noted that, in the process of determining semantic segmentation, embodiments may also provide instance segmentation of real-world objects on which said embodiments were trained.

Embodiments solve multiple technical problems. For instance, embodiments can achieve more accurate segmentation of porous and/or low-contrast materials in electrodes, such as CBD, among other examples.

Furthermore, embodiments provide a general workflow for multiphase semantic segmentation that can support an arbitrary number and/or type of materials. Embodiments also allow for optional manual user prompting, e.g., through single mouse clicks or estimation segmentation. Using such optional prompting and one or more transformer model(s), e.g., backbone large-scale general transformer(s), an example embodiment can outperform conventional semantic segmentation methods.

An example embodiment may leverage one or more transformer model(s), such as pretrained, large-scale, general transformer(s). For instance, embodiments may use the Segment Anything Model (SAM) or any other suitable model known to those of skill in the art. In an example embodiment, one or more segmentation transformer(s) may be domain-adapted for each material present in an image, e.g., a X-ray computed tomography (XCT) scan. Embodiments may utilize models each trained or fine-tuned to identify a respective material. For instance, according to an example embodiment, a version of SAM may be fine-tuned to segment, e.g., graphite in an electrode, another version may be fine-tuned to segment silicone, and so on. In yet another example embodiment, if a new XCT scan is provided, separate models may provide segmentations of respective materials for which the separate models have been specialized. According to an example embodiment, separate segmentations may be merged or integrated via a combiner model, such as a U-Net structure, to achieve a final, multiphase semantic segmentation of an original scan.

In an example embodiment, to segment, e.g., XCT electrodes with four materials, five different components may be trained. Specifically, in such an embodiment, four transformers may be domain-adapted, one for each material and a combiner model, e.g., a U-Net or other suitable known model—i.e., a fifth component—may be trained to merge or integrate outputs of specialized transformers (i.e., the four domain-adapted transformers). According to an example embodiment, if a user identifies an additional material to be segmented, a further transformer may be augmented/adapted, and a new (or replacement) combiner model, e.g., a U-Net, may be trained. In another example embodiment, adding additional materials may only require adaptation or augmentation of a subsequent transformer, and training of a new combiner model, e.g., a U-Net model—no retraining of previously-adapted transformers may be necessary.

Further, some embodiments relate to computer vision.

An example embodiment is directed to a computer-implemented method for determining semantic segmentation of real-world objects. The method begins by obtaining an image of a real-world object. Next, the method processes the obtained image using a plurality of vision transformer (ViT) models to generate a plurality of segmentation masks, e.g., images representing binary segmentations. In an example embodiment, each mask may represent a binary segmentation of one domain, with each pixel classified as either part of that domain, e.g., a material, or not. To continue, each ViT model is configured to output a respective segmentation mask corresponding to a respective target material. Using a neural network combiner model, the method then generates a multiphase semantic segmentation mask based on the plurality of segmentation masks. The neural network combiner model is trained to integrate outputs of the plurality of ViT models. By generating the multiphase semantic segmentation mask, the method thereby determines semantic segmentation of the real-world object.

In an example embodiment, once the ViT models are configured for the respective target materials and the combiner model is trained, segmentation can be performed on any objects that consist of between one and all of the target materials without a need for additional configuration or training. According to another example embodiment, if it is known that fewer target materials are present in test images (i.e., images being analyzed) than were included in training images, an alternative approach may be to discontinue use of corresponding transformers adapted to the missing materials and retrain the combiner model to generate a multiphase semantic segmentation mask for the materials actually present in the test images.

According to an example embodiment, the combiner model may be configured to resolve disagreements among the ViT models, for instance, over an appropriate segmentation for a given pixel in the obtained image. In another example embodiment, the combiner model may incrementally adjust its behavior based on outputs of the ViT models. Further, in yet another example embodiment, adjusting behavior of the combiner model may include assigning different weights to different layers of the ViT model outputs.

In an example embodiment, the method may further include adapting a given ViT model of the plurality of ViT models based on a plurality of training data pairs. Each of the plurality of training data pairs may include a raw training image and an annotated training image. The raw training image and the annotated training image may each include indications of target material(s). According to another example embodiment, the adapting may include configuring the given ViT model with an encoding convolutional layer, a rectified linear unit (ReLU) convolutional layer, and/or a decoding convolutional layer. Further, in yet another example embodiment, the adapting may be configured with an epoch count between 100 and 50,000, a batch size between 5 and 100, and/or a learning rate between 0.5 and 0.00001.

According to an example embodiment, the method may further include identifying a plurality of structures in annotated training images of the plurality of training data pairs. Each of the identified plurality of structures may correspond to a given target material. The method may further include, based on the identified plurality of structures, determining a distribution of metric(s). The method may further include generating a plurality of synthetic structures based on the determined distribution of the metric(s). The method may further include translating the generated plurality of synthetic structures into a corresponding plurality of synthetic segmentation masks and, based on the plurality of synthetic segmentation masks, generating a plurality of synthetic training images.

In an example embodiment, each annotation in the annotated training images may be an ellipse and each of the identified plurality of structures may correspond to a respective ellipse. The metric(s) may include an ellipse major axis size, an ellipse minor axis size, and/or an ellipse axis angle. According to another example embodiment, the translating may use a cycle-consistent generative adversarial network (GAN) model. In yet another example embodiment, the method may further include training the cycle-consistent GAN model with an epoch count between 50 and 10,000, a batch size between 5 and 50, and/or a learning rate between 0.5 and 0.00001.

According to an example embodiment, the method may further include determining a structural similarity index measure (SSIM) based on the generated plurality of synthetic training images and raw training images of the plurality of training data pairs.

In an example embodiment, the method may further include training the neural network combiner model based on a plurality of training data tuples. Each of the plurality of training data tuples may include a raw training image and respective outputs of the plurality of ViT models. The respective outputs may be generated by the plurality of ViT models based on the raw training image. In an example embodiment, the training of the combiner model may be configured with an epoch count between 50 and 1,000, a batch size between 5 and 20, and/or a learning rate between 0.5 and 0.00001.

According to an example embodiment, the neural network combiner model may include skip connection(s) between corresponding layers of the neural network combiner model. In another example embodiment, the neural network combiner model may include an encoder-decoder module.

In an example embodiment, a given respective target material may be pore, silicon, CBD, or graphite.

According to an example embodiment, one of the plurality of ViT models may be a Segment Anything Model (SAM) or a ViT-Huge (ViT-H) model.

In another example embodiment, the neural network combiner model may be a U-Net model.

According to an example embodiment, the real-world object may be any real-world object. For instance, in an example embodiment, the real-world object may be an electrode.

In an example embodiment, the method may further include receiving an indication of interest from a user. The indication of interest may correspond to a region of the obtained image or one or more materials in the obtained image. In such an embodiment, generating the plurality of segmentation masks may be further based on the received indication of interest.

Another example embodiment is directed to a computer-based system for determining semantic segmentation of real-world objects. The system includes a processor and a memory with computer code instructions stored thereon. In such an embodiment, the processor and the memory, with the computer code instructions, are configured to cause the system to implement any embodiments or combination of embodiments described herein.

Yet another example embodiment is directed to a cloud computing implementation for determining semantic segmentation of real-world objects. Such an embodiment is directed to a non-transitory computer program product executed by a server in communication across a network with one or more clients, where the computer program product comprises a computer-readable medium with program instructions which, when executed by one or more processors, cause the one or more processors to implement any embodiments or combination of embodiments described herein.

It is noted that embodiments of the method, system, and computer program product may be configured to implement any embodiments, or combination of embodiments, described herein.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1:
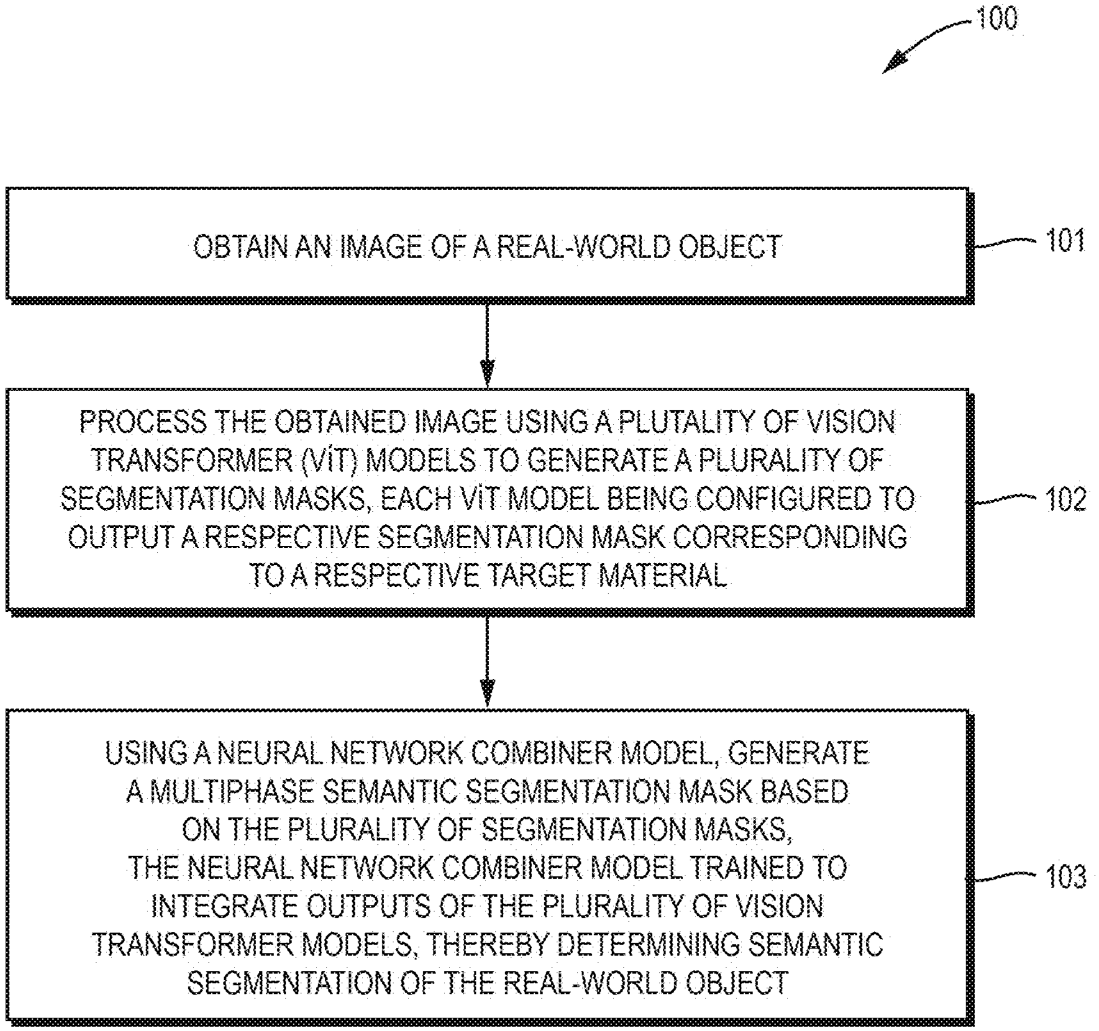
FIG. 1 is a flowchart of a method for determining semantic segmentation of real-world objects according to an embodiment.

A description of example embodiments follows.

Semantic segmentation is a computer vision technique that identifies contents of a given image. For instance, for a picture of an office cubicle, a semantic segmentation system may label each pixel as belonging to "chair," "desk," "laptop," "floor," and so on. This may be done by classifying each pixel as one of the potential materials present in the image. For semantic segmentation, a given system may recognize the material of each pixel by learning from training examples. Such training examples may be image pairs of (i) an unaltered, unprocessed image and (ii) an annotated version of the image where a domain expert has hand-classified each pixel as a given material. For instance, for X-ray computed tomography (XCT) scans of electrodes, e.g., four pixel types may be present: pore, silicon, carbon black-binder (CBD), and graphite. To generate a training dataset, a researcher may hand annotate each instance of each of these materials in example XCT scans.

Upon acquiring such a labeled training dataset, a semantic segmentation system can be generated to predict a composition of future XCT scans. One conventional model for such semantic segmentation applications is U-Net, which is a type of combiner model—specifically, a neural network combiner model. A traditional combiner model such as U-Net may use, e.g., convolutional modules, to encode and/or decode spatial information within an image. This conventional approach may be a poor choice for noisy and/or complex structures like battery electrodes—for instance, because a simple combiner architecture including an encoder and decoder may be inadequately complex and may lack features like attention and/or user prompting. Existing combiner models often struggle with low-contrast, grainy, porous, and/or amorphous materials, thus leading to poor semantic predictions, e.g., the inability to accurately segment the CBD domain in electrodes.

Another current approach to semantic segmentation is using deep learning techniques to expand a training dataset. Generative artificial intelligence (AI) can be trained to create synthetic scans that accurately mimic images of real-world objects, such as electrodes, among other examples. In addition, synthetic scans may be algorithmically labeled to generate pairs of scans and annotated scans, i.e., images, similar to hand-annotation done on real scans by domain experts. Such AI-generated data may be used to further train a combiner model, e.g., a U-Net model. This may improve performance, because a model may "see" more data and gain experience segmenting irregular structures. However, this conventional approach may be insufficient, because it may require adequate training of a secondary deep learning model, e.g., a generative AI model for creating the synthetic images. It may be challenging to train AI to generate images that are structurally and/or stylistically realistic. This may be especially true for modeling microstructures or amorphous and/or irregular materials. If synthetic scans are not realistic enough, then adding the synthetic scans to a training process for a combiner model, e.g., U-Net, may not achieve improved results.

Transformers are large-scale models that are trained using a large dataset of a wide variety of images. Use of attention mechanisms may allow transformers to be adapted to various tasks, including image segmentation. Because transformers may be trained on an order of millions of images, transformers typically outperform specialized models like U-Nets once the transformers are adapted to a specific task. One existing approach for semantic segmentation is to directly use transformer models on images of real-world objects, such as electrodes. However, transformers may perform poorly on such scans, because most transformer training data is of natural scenes (e.g., images of streets, nature, people, etc.) and not material microstructures like electrodes. Furthermore, transformers are not ordinarily used to perform semantic segmentation, and thus may be unable to identify type(s) of material(s) present in an image. Among other innovations, embodiments provide transformer adaptation methods that both improve segmentation performance and achieve deeper semantic understanding of material(s) present in images of real-world objects. Such improved structural understanding may be leveraged to obtain more accurate metric computations and performance evaluations of real-world objects.

Example Method Embodiments

FIG. 1 illustrates one such example method embodiment 100. The method 100 is a computer-implemented method for determining semantic segmentation of real-world objects. The method 100 begins at step 101 by obtaining an image of a real-world object. Next, at step 102, the method 100 processes the obtained image using vision transformer (ViT) models to generate segmentation masks. Each ViT model is configured to output a respective segmentation mask corresponding to a respective target material (i.e., each ViT model is configured to identify a different material). Using a neural network combiner model, at step 103, the method 100 then generates a multiphase semantic segmentation mask based on the plurality of segmentation masks (i.e., the masks generated at step 102). The neural network combiner model is trained to integrate outputs of the ViT models. By generating the multiphase semantic segmentation mask at step 103, the method 100 thereby determines semantic segmentation of the real-world object.

As noted above, the method 100 is computer implemented and, as such, the functionality and effective operations, e.g., the obtaining (101), processing (102), and generating (103), are automatically implemented by one or more digital processors. Moreover, the method 100 can be implemented using any computer device or combination of computing devices known in the art. Among other examples, the method 100 can be implemented using the computer system 660 described hereinbelow in relation to FIG. 6 and the computer network environment 770 described hereinbelow in relation to FIG. 7.

At step 101, the image of the real-world object may be obtained from any device that is communicatively coupled or capable of being communicatively coupled to a computing device implementing the method 100. For instance, in embodiments, the image can be obtained at step 101 directly from an image capture device or can be obtained from an image storage device, e.g., a database.

In an example embodiment, the method 100 may further include adapting a given ViT model of the ViT models (used at step 102) based on training data pairs. Each of the training data pairs may include a raw training image and an annotated training image. The raw training image and the annotated training image may each include indications of target material(s). For instance, according to an example embodiment, indications on raw images may be in the form of prompts, e.g., highlighted points and/or regions of interest, while annotated images may have each pixel classified as a particular target material. In another example embodiment, annotated images may have binary-type classifications, e.g., pixels in an annotated image are classified as being a particular target material or not being the particular target material. According to an embodiment of the method 100, the adapting may include configuring the given ViT model with an encoding convolutional layer, a rectified linear unit (ReLU) convolutional layer, and/or a decoding convolutional layer. For instance, in an example embodiment, tuned parameters of the given ViT model can be updated and/or additional parameters (e.g., in convolutional layers) can be included to further tune the given ViT model. According to another example embodiment, by performing such additional training, the given ViT model can be adapted for a particular domain application. In an embodiment of the method 100, the adapting may be configured with an epoch count between 100 and 50,000, a batch size between 5 and 100, and/or a learning rate between 0.5 and 0.00001.

According to an example embodiment, the method 100 may further include identifying structures in annotated training images of the training data pairs. Each of the structures may correspond to a given target material. The method 100 may further include, based on the identified structures, determining a distribution of metric(s), e.g., porosity and/or tortuosity, which may be based on a presence of pores and/or solid structures, and their relative layouts. The method 100 may further include generating synthetic structures based on the determined distribution of the metric(s). The method 100 may further include translating the generated synthetic structures into corresponding synthetic segmentation masks. The method 100 may further include, based on the synthetic segmentation masks, generating synthetic training images. In an example embodiment, a statistical analysis of annotated real scans may be performed. According to another example embodiment, each instance of each material present may be represented as an ellipse, and, e.g., a minor axis, major axis, and/or rotation angle, may be calculated for each object. In this way, for a hypothetical use case involving electrodes, thousands of examples may be produced of a rough size and/or shape of a piece of graphite, for instance. In yet another example embodiment, a probability distribution may be created for the metrics (e.g., minor axis, major axis, and/or angle) for each material. According to an example embodiment, this may allow an example embodiment to create rough synthetic meshes of electrodes, randomly generated according to such calculated distributions. In another example embodiment, synthetic meshes may then be turned into annotated synthetic electrode images through a cycle-consistent generative adversarial network (CycleGAN)-style transfer process. Thus, each pixel of a synthetic electrode image may be classified as, e.g., one of four materials. In yet another example embodiment, annotated electrode scans may in turn be converted into simulated XCT scans using, e.g., a Python program and/or the ASTRA (All Scales Tomographic Reconstruction Antwerp) Toolbox; other known programs and/or toolboxes are also suitable. According to an example embodiment, annotated and simulated XCT images may serve as training data pairs.

In an embodiment of the method 100, each annotation in the annotated training images may be an ellipse and each of the identified structures may correspond to a respective ellipse. The metric(s) may include an ellipse major axis size, an ellipse minor axis size, and/or an ellipse axis angle. Further, embodiments are not limited to using an ellipse for purposes of annotation and any annotation methodology or geometric shape and corresponding metric(s) known in the art may be employed. For instance, if one target material naturally appears as a quadrilateral, the target material can be represented as a rectangle, and distributions can be determined for, e.g., its length, width, and/or rotation angle. According to an embodiment of the method 100, the translating may use a cycle-consistent generative adversarial network (GAN) model (i.e., a CycleGAN model). In yet another example embodiment, the method 100 may further include training the cycle-consistent GAN model with an epoch count between 50 and 10,000, a batch size between 5 and 50, and/or a learning rate between 0.5 and 0.00001.

According to an example embodiment, the method 100 may further include determining a structural similarity index measure (SSIM) based on the generated synthetic training images and raw training images of the training data pairs. In another example embodiment, where semantic segmentation is to be determined for, e.g., electrodes, a SSIM may be used to guide creation of synthetic electrode images. According to yet another example embodiment, a SSIM may be used to tune pre-CycleGAN mesh creation and/or XCT simulation methods. In an example embodiment, procedures may be refined to increase a SSIM of generated images, compared to real/collected images, as this may indicate more "realistic" synthetic images.

In an example embodiment, the method 100 may further include training the neural network combiner model based on training data tuples. Each of the training data tuples may include a raw training image and respective outputs of the ViT models. The respective outputs may be generated by the ViT models based on the raw training image. According to an embodiment of the method 100, training the neural network combiner model may be configured with an epoch count between 50 and 1000, a batch size between 5 and 20, and/or a learning rate between 0.5 and 0.00001.

In an embodiment of the method 100, the neural network combiner model used at step 103 may include skip connection(s) between corresponding layers of the neural network combiner model. According to another embodiment of the method 100, the neural network combiner model used at step 103 may include an encoder-decoder module.

According to an embodiment of the method 100, a given respective target material may be pore, silicon, carbon black-binder (CBD), or graphite. Further, it is noted that embodiments are not limited to the foregoing target materials and, instead, embodiments of the method 100 can be implemented to identify any target material.

In an embodiment of the method 100, the ViT models may be a Segment Anything Model (SAM) or a ViT-Huge (ViT-H) model, among other examples.

According to an embodiment of the method 100, the neural network combiner model may be a U-Net model, amongst other examples.

In an embodiment of the method 100, the real-world object may be an electrode or any other real-world object.

Embodiments of the method 100 may utilize user input indicating, for instance, areas of interest in an image. In other words, in an example embodiment, a user can indicate a portion of the obtained image for which the segmentation determination should be performed. According to one such example embodiment, the method 100 further includes receiving an indication of interest from a user. The indication of interest may correspond to a region of the obtained (101) image or one or more materials in the obtained (101) image. Generating the plurality of segmentation masks may be further based on the received indication of interest. In an example embodiment, a user may (1) select a target material and (2) provide, e.g., a point, box, or cursor-painted area that indicates a region of interest with respect to the selected material. For instance, a user may select "graphite" and then put a point, box, or drawing, etc., over a region of an image that contains a graphite particle the user is interested in.

Example System Embodiments

Figure 2:
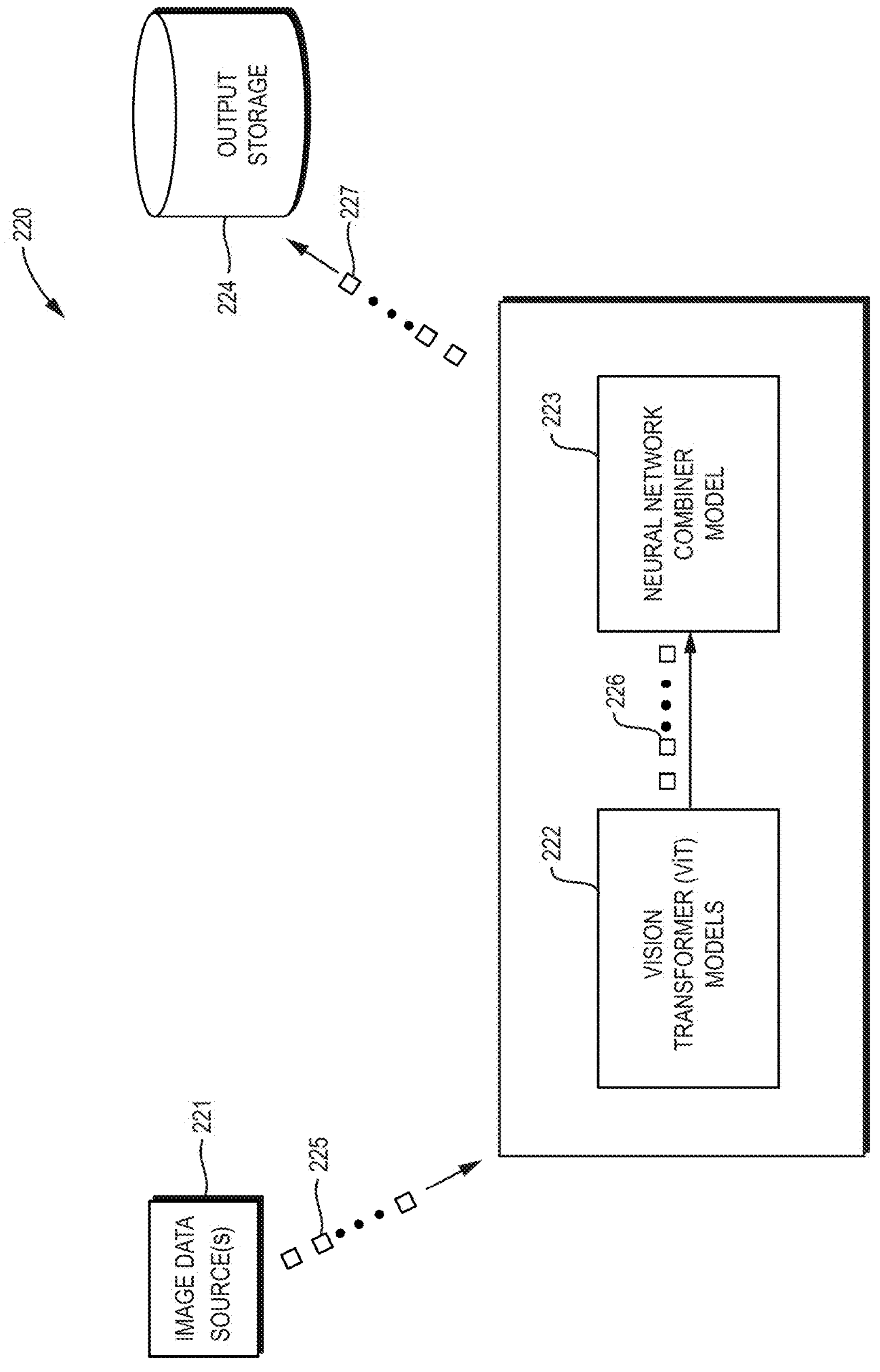
FIG. 2 is a simplified block diagram of a system for determining semantic segmentation of real-world objects according to an embodiment.

FIG. 2 is a simplified block diagram of a system 220 for determining semantic segmentation of real-world objects according to an embodiment.

As shown in FIG. 2, in an example embodiment, the system 220 includes one or more data source(s) 221, ViT models 222, neural network combiner model 223, and output storage 224.

In an example embodiment, the data source(s) 221 may include image data, e.g., images of real-world objects for which semantic segmentation is to be performed. According to another example embodiment, the data source(s) 221 may be provided by a user (not shown) of the system 220. Further, in yet another example embodiment, the data source (s) 221 may be used as input to the ViT models 222.

According to an example embodiment of the system 220, an image 225 of a real-world object is sent from the image data source(s) 221, via any communication methodology known to those of skill in the art, to the ViT models 222. In turn, the ViT models 222 process the image 225 of the real-world object to generate segmentation masks 226, which are sent to the neural network combiner model 223. According to an example embodiment of the system 220, each of the ViT models 222 is configured to output a respective segmentation mask 226 corresponding to a respective target material (not shown).

To continue, using the segmentation masks 226 output by the ViT models 222, the neural network combiner model 223 generates a multiphase semantic segmentation mask 227 which is then sent to output storage 224 for access by one or more users (not shown). In an example embodiment of the system 220, the neural network combiner model 223 may be trained to integrate outputs (e.g., masks 226) of the ViT models 222.

By generating the multiphase semantic segmentation mask 227, the system 220 thereby determines semantic segmentation of the real-world object.

According to an example embodiment of the system 220, a given ViT model of the ViT models 222 may be adapted based on training data pairs (not shown). In another example embodiment of the system 220, each of the training data pairs may include a raw training image (not shown) and an annotated training image (not shown). Further, in yet another example embodiment of the system 220, the raw training image and the annotated training image may each include indications of target material(s) (not shown).

In an example embodiment of the system 220, the neural network combiner model 223 may be trained on training data tuples (not shown). According to another example embodiment of the system 220, each of the training data tuples may include a raw training image (not shown) and respective outputs (not shown) of the ViT models 222. Further, in yet another example embodiment of the system 220, the respective outputs may be generated by the ViT models 222 based on the raw training image.

According to an example embodiment of the system 220, the multiphase semantic segmentation mask 227 generated by the neural network combiner model 223 may be output to the storage 224. In another example embodiment of the system 220, once recorded in the storage 224, the multiphase semantic segmentation mask 227 may then be used for various practical applications, such as research and development or analysis of electrodes or other composite materials, as well as medical imaging (e.g., radiology) and identifying cell growth, among other examples. In an example embodiment, semantic segmentation results can be used to identify design changes for manufacturing real-world objects and can be used to modify real-world manufacturing processes of real-world objects. For instance, results (e.g., the multiphase semantic segmentation mask 227) may show that a real-world object, e.g., an electrode, has an undesirable material distribution and, in turn, an electrode manufacturing process may be modified so as to generate electrodes with a preferred material distribution. As another real-world example, cell cultures that are identified by embodiments as showing an undesirable growth pattern may be re-engineered to produce a more desirable growth pattern.

It should be noted that the system 220 can implement any embodiments described herein, e.g., the method 100 described hereinabove with respect to FIG. 1, to determine semantic segmentation of real-world objects.

Example Training Dataset Creation

Embodiments may determine semantic segmentation of real-world objects using machine learning (ML) models, e.g., the ViT models 222 (FIG. 2) and/or the neural network combiner model 223 (FIG. 2), which may be trained and/or adapted based on training data pairs each including a raw training image and an annotated training image. In an example embodiment, it may be desirable to determine semantic segmentation of real-world electrodes, e.g., lithium-ion (Li-ion) electrodes. According to another example embodiment, to conduct such model training, e.g., raw and hand-segmented XCT scans may be used for raw training images and annotated training images, respectively, in training data pairs. However, other known image types are also suitable. In yet another example embodiment, e.g., publicly available Li-ion electrode scans may be utilized; other known electrode scans are also suitable. A given electrode scan may include, e.g., three electrodes at four different stages of use.

In an example embodiment, scans may optionally be pre-processed. According to another example embodiment, cubic interpolation may be used to achieve uniform dimensions, e.g., 1673×1673×1673 voxels, across electrodes. However, other suitable known interpolation techniques may also be used. Further, in yet another example embodiment, a min-max normalization method may be used on raw scans to prepare the raw scans for model training; other known normalization methods are also suitable. In an example embodiment, a three-dimensional (3D) scan may be sliced along, e.g., a vertical axis, producing two-dimensional (2D) images.

According to an example embodiment, a training dataset creation process may result in, e.g., 20,076 pairs of raw and annotated scans. In another example embodiment, a given raw or annotated scan may include, e.g., one or more of four possible materials—in a use case involving electrodes. According to yet another example embodiment, annotated scans that serve as inputs for transformer adaptation training may each have a single material present. For instance, an annotated scan used to adapt a transformer for segmenting graphite may have the graphite highlighted (or classified as '1' [one]) with a remainder of the scan unhighlighted (or classified as '0' [zero]). In an example embodiment, an annotated scan used to train a combiner model may include all the materials. For example, pore pixels may be classified as '0' [zero], graphite pixels may be classified as '1' [one], CBD pixels may be classified as '2' [two], and so on. To continue, if each of 20,076 pairs (1,673 images per scan for each of 12 electrode configurations [i.e., three electrodes each at four possible stages of use] resulting in 20,076 images) includes one of four possible materials, this may result in computing a total of 80,304 image pairs each including one binary segmentation of one material and one raw scan. Further, in yet another example embodiment, computations may be based on a selected 3D scan size of, e.g., 1673×1673×1673 voxels. This exemplary size may be chosen to minimize artifacts caused by pre-processing, but other suitable sizes may also be used. According to an example embodiment, a given dimension can range from, e.g., 100 to 10,000 pixels, and a resized 3D scan may not have to be a cube; other suitable dimensions and/or geometries may also be used.

Example Transformer Model Domain Adaptation

In an example embodiment where it is desired to determine semantic segmentation of real-world objects, e.g., electrodes, a training dataset may be divided based on a number of objects, e.g., 12 electrodes, that are present. According to another example embodiment, data from six electrodes may be used to domain-adapt general transformer models, e.g., the ViT models 222 (FIG. 2), to segment, e.g., four materials, respectively. Further, in yet another example embodiment, for such training, five electrodes may be used to tune model parameters, and one electrode may be used for validation and/or testing. According to an example embodiment, a Medical SAM Adapter (MSA) method may be utilized, where encoding, ReLU, and/or decoding convolutional layers may be added to, e.g., one or more of the ViT models 222, before an attention module of a SAM ViT architecture. However, other known adapting techniques are also suitable. To continue, utilizing the MSA method may result in a total of, e.g., 100,000 to 10,000,000 parameters. In another example embodiment, training may be performed for approximately 100 to 50,000 epochs, with a batch size of approximately 5 to 100, and/or with a learning rate varying from approximately 0.5 to 0.00001; other suitable epoch counts, batch sizes, and/or learning rates may also be used. Further, in yet another example embodiment, a different known transformer model, either based on SAM or not, may be used. According to an example embodiment, training may be performed for each of, e.g., four phases present, which may produce, e.g., four distinct adapted transformers. In another example embodiment, the resulting, e.g., four material-specific transformers, may optionally be stored in terms of their weights (including internal training parameters and/or other variables) and/or ancillary data structures. Further, in yet another example embodiment, model parameters and/or variables, etc., may be stored in, e.g., a ".pth" file using PyTorch® or other suitable known tool.

Example Combiner Model Training

In an example embodiment where it is desired to determine semantic segmentation of real-world electrodes, resulting domain-adapted transformers, e.g., the ViT models 222 (FIG. 2), may be used to generate segmentation masks for, e.g., five of six remaining unused electrode datasets from an original collection of 12 datasets. In another example embodiment, such a process of generating segmentation masks may result in, e.g., 8,365 "five-to-one" training data pairs. Put another way, each annotated training image, e.g., a hand-annotated scan, may be linked to, e.g., four (one for each material present), segmentation masks predicted by transformer models, e.g., the ViT models 222, and one raw training image. Further, in yet another example embodiment, a combiner model, e.g., the neural network combiner model 223 (FIG. 2) such as a U-Net architecture or other suitable known architecture, may be configured to predict a final semantic segmentation mask based on, e.g., five inputs. According to an example embodiment, an encoder-decoder module architecture, for instance, may be utilized with a combiner model; other known architectures are also suitable. In another example embodiment, a combiner model may include one or more skip connection(s) between corresponding layer(s). However, other suitable known connection types may also be used. In yet another example embodiment, an input size of, e.g., 1673×1673×5 (i.e., five (1673, 1673) layers, consisting of four partial segmentations outputted by adapted transformers and one original scan), for a combiner model may be encoded using, e.g., 7×7 pixel convolutional kernels, optionally separated by pooling layers. Other suitable image sizes, kernel types or sizes (e.g., 3×3, 5×5, etc.), and/or layer types may also be used. According to an example embodiment, such an architecture may include, e.g., 10,000 to 1,000,000 total parameters. In another example embodiment, training of a combiner model, e.g., the neural network combiner model 223, may be performed for, e.g., approximately 50 to 1,000 epochs, with a batch size of approximately 5 to 20, and/or with a learning rate varying from approximately 0.5 to 0.00001; other suitable epoch counts, batch sizes, and/or learning rates may also be used. Further, in yet another example embodiment, combiner model, e.g., the neural network combiner model 223, performance on unseen validation data may be used to evaluate segmentation accuracy of an entire architecture, e.g., the system 220 (FIG. 2). According to an example embodiment, e.g., 1,673 remaining scans corresponding to a final, unused electrode, may be used for combiner model evaluation.

Example Synthetic Scan Generation

In an example embodiment where it is desired to determine semantic segmentation of real-world electrodes, additional procedures may be undertaken to improve model performance using synthetic scans to expand a training dataset. According to another example embodiment, a statistical analysis of electrode structure and/or composition may be performed. In yet another example embodiment, for, e.g., 20,076 total hand annotated scans, encompassing, e.g., 12 electrodes, each distinct material microstructure may be inscribed in an ellipse; other suitable known shapes may also be used. According to an example embodiment, metrics for each ellipse, including a size of a major axis, a size of a minor axis, and/or an axis angle, may be recorded. However, other known metrics are also suitable. To continue, in another example embodiment, for each of, e.g., four materials present in electrodes, a distribution of each of the foregoing metrics (i.e., the ellipse metrics) may be computed. Further, in yet another example embodiment, such distributions may be utilized to compute, e.g., 1,000 to 10,000 statistically-realistic mesh microstructures for the electrodes. According to an example embodiment, optional filtering may be performed to eliminate meshes containing more than, e.g., 40-80% pixels of a single phase, because these may not sufficiently contribute to model training. In another example embodiment, a cycle-consistent GAN model may be trained to translate such rough meshes into realistic segmentation masks for XCT scans; other known models are also suitable. Yet another example embodiment may train, e.g., 10,000 to 1,000,000 total parameters for, e.g., approximately 50 to 10,000 epochs, with a batch size of approximately 5 to 50, and/or with a learning rate varying from approximately 0.5 to 0.00001. However, other suitable epoch counts, batch sizes, and/or learning rates may also be used. In an example embodiment, a result of synthetic scan generation may be, e.g., 1,000 to 10,000 realistic, yet AI-generated segmentation masks. According to another example embodiment, the "simple-ct-sim" tool may be used to simulate an XCT scan for each segmentation mask; other known tools are also suitable.

In an example embodiment, further optional augmentation may be performed, including, e.g., noise generation and/or XCT artifact introduction, to make realistic XCT scans for each synthetic segmentation mask. According to another example embodiment, a final result of synthetic scan generation (optionally with further augmentation) may be, e.g., 1,000 to 10,000 synthetic scans and segmentation mask pairs.

According to an example embodiment, a SSIM evaluation may be performed that compares real and synthetic training images, e.g., XCT scans of real-world electrodes. In another example embodiment, such testing may result in an average structural similarity score of, e.g., 0.8 to 1.0; the SSIM may depend on, e.g., various mesh parameters, XCT simulation parameters, and an electrode being used for comparison. Further, in yet another example embodiment, synthetic data may be added to an original training dataset, producing a final size of, e.g., 17,000 to 30,000 training examples. According to an example embodiment, given a convincing nature of synthetic data and an inability of a GAN decoder to identify synthetic structures, re-augmenting transformers, e.g., the ViT models 222 (FIG. 2), and re-training a combiner model, e.g., the neural network combiner model 223 (FIG. 2) such as a U-Net, may increase segmentation accuracy by, e.g., 5-15% across each material. In another example embodiment, such as when determining semantic segmentation of electrodes, an increase in accuracy may be particularly noticeable for the challenging CBD domain.

Example Implementation of User Prompting

Figure 3:
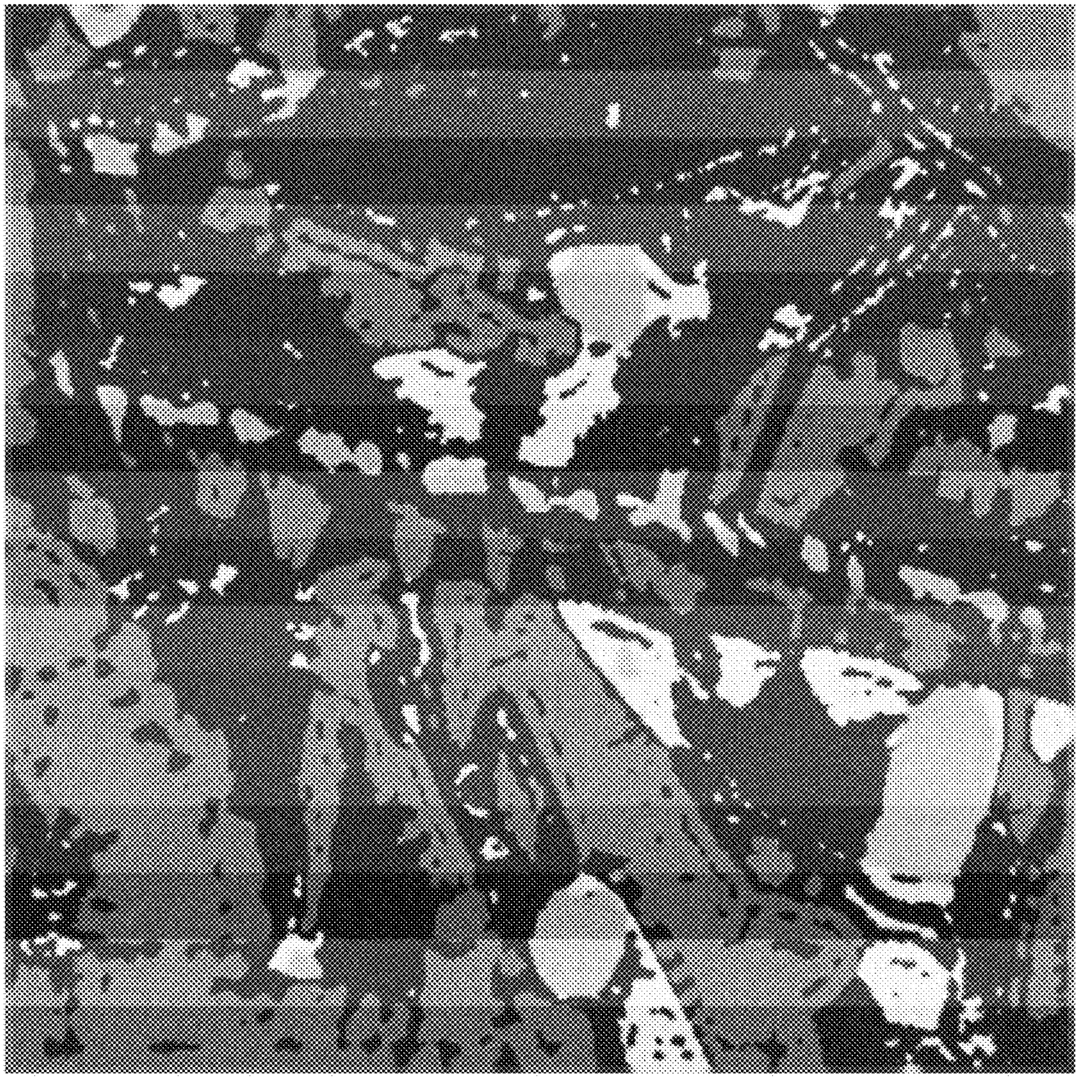
FIG. 3 is an image of an example scan according to an embodiment.

FIG. 3 is an image 330 of an example scan according to an embodiment. In an example embodiment, the image 330 may be a 2D slice of an electrode XCT scan.

Figure 4:
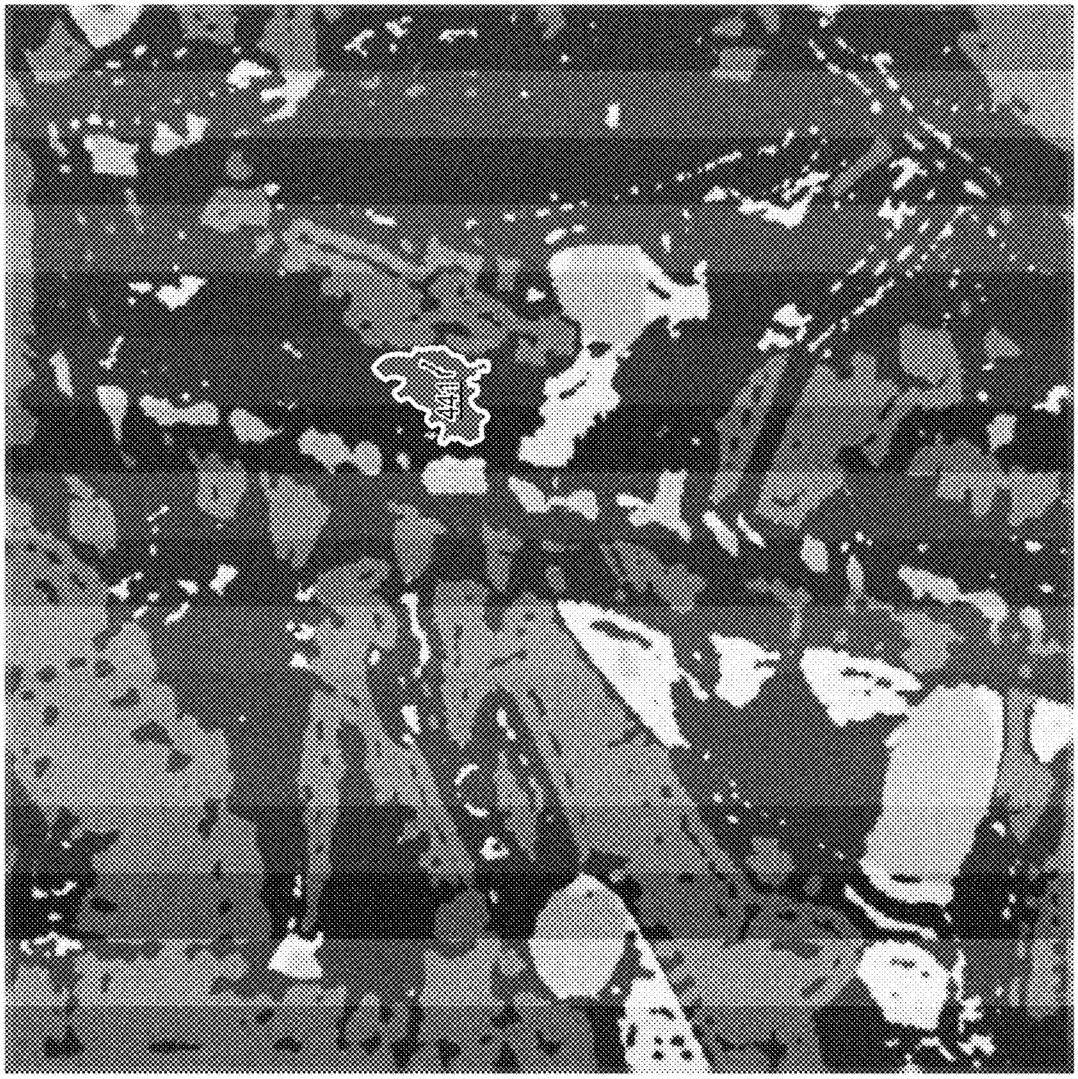
FIG. 4 is an image with example user input according to an embodiment.

FIG. 4 is an image 440 with an example user indication of interest according to an embodiment. As shown in FIG. 4, in an example embodiment, a user (not shown) may provide an indication via painting a region 441 of interest.

Figure 5:
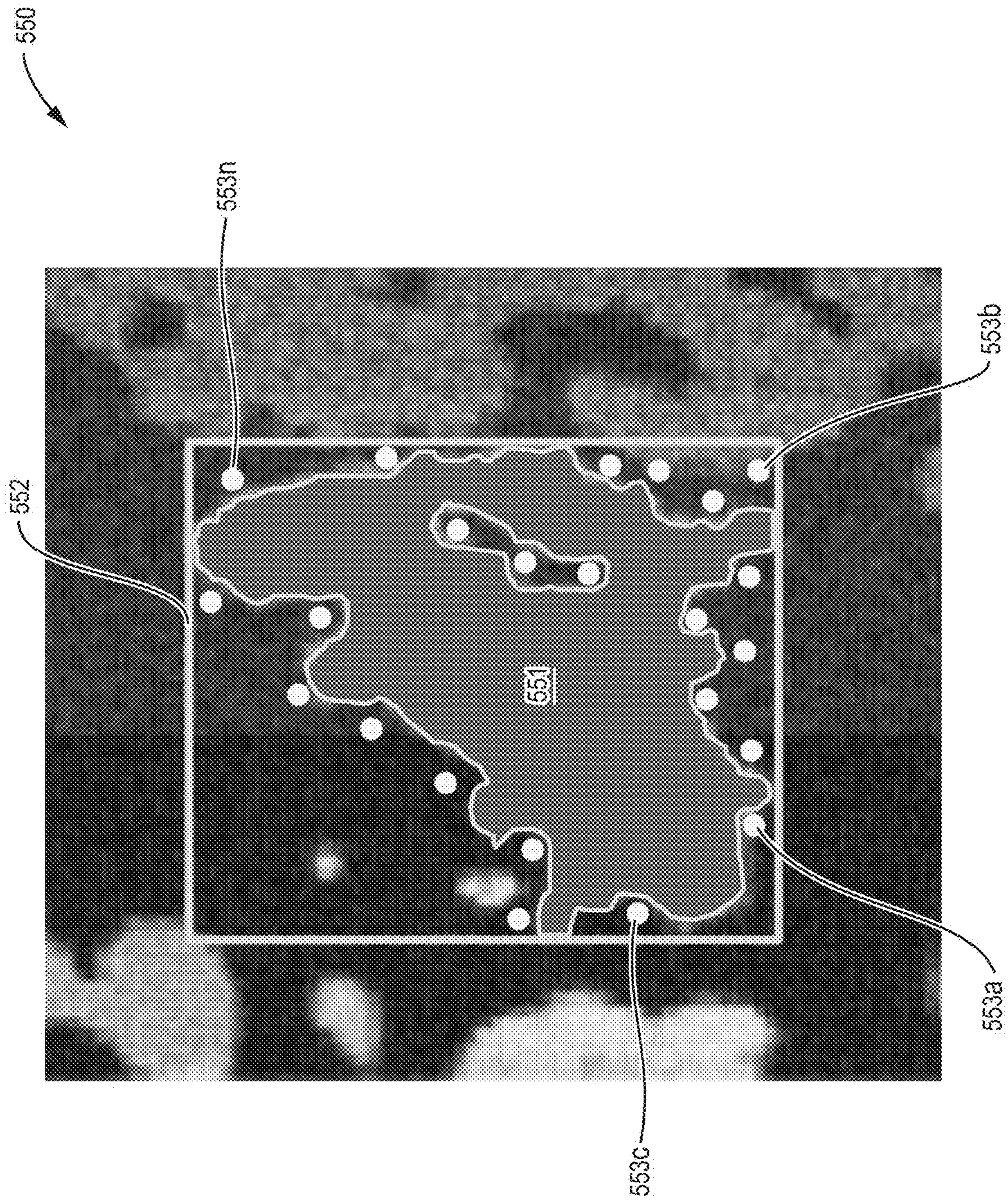
FIG. 5 is an image with an example of conversion of user input into a transformer prompt according to an embodiment.

FIG. 5 is an image 550 with an example of converting a user indication of interest into a transformer prompt according to an embodiment. As shown in FIG. 5, in an example embodiment, a painted (e.g., by a user) region 551 of interest may be converted into a boxed region 552 of interest and points 553*a-n* of negative interest.

In an example embodiment, such as when determining semantic segmentation of a real-world electrode, for some applications or users, particular regions and/or materials within the electrode may have additional importance. According to another example embodiment, to place emphasis on accurate segmentation of such regions, users can "prompt" an adapted transformer for a material of interest. Further, in yet another example embodiment, anywhere from zero to all relevant materials can be segmented based on one or more user prompt(s). In certain embodiments, such prompts may be provided as points of affirmative and/or negative interest (e.g., as indicated by mouse click(s) or other suitable known user interaction(s)) or a region of interest (e.g., as indicated by hand-drawing a 2D mask or other suitable known user interaction). According to an example embodiment, a user prompt may be encoded separately by a transformer, e.g., the ViT model(s) 222 (FIG. 2), and may provide the transformer with more information on what to "focus on." In another example embodiment, a transformer may give additional attention to region(s) highlighted via prompting, thereby increasing accuracy.

In addition to the preceding traditional methods, to address cases where irregular and/or complex formations are present in images of real-world objects, e.g., electrodes, embodiments may also allow a user to "paint" over regions of interest, e.g., 441 (FIG. 4) or 551 (FIG. 5), such as with a mouse or via other suitable user interaction known to those of skill in the art. According to an example embodiment, before such a prompt is fed into a given transformer, user input may be automatically converted into box(es), e.g., 552 (FIG. 5), and/or negative point(s), e.g., 553*a-n* (FIG. 5). The prompting options of embodiments produce higher quality segmentation for desired regions of interest. In another example embodiment, user prompt(s) may be encoded and/or processed so as to provide additional guidance to transformer models, e.g., the ViT models 222 (FIG. 2). For instance, according to yet another example embodiment, additional guidance based on user prompt(s) may be provided to transformer models together with an input image.

It is noted that while, herein, example training dataset creation, transformer model domain adaptation, combiner model training, synthetic scan generation, and implementation of user prompting are described in relation to electrodes, these techniques may be utilized in relation to any real-world objects and are in no way limited to electrodes.

Advantages

Embodiments determine semantic segmentation of real-world objects, and offer numerous advantages.

For example, embodiments outperform existing semantic segmentation methods for analysis of low-contrast and irregular materials depicted in XCT scans, e.g., electrode scans. Embodiments are particularly able to segment low-contrast and irregular materials like the CBD domain, on which conventional models typically struggle. This domain may be useful in determining porosity and/or overall structure of an electrode, because the CBD domain may often be the "fluffy" material in between larger, more prominent structures. As a result, embodiments provide a better structural representation of an electrode, and ultimately more accurate metric computation and performance evaluation for a real-world object.

As another example advantage, embodiments are modular in terms of materials they can segment. Embodiments can support an arbitrary number of different materials, without having to retrain an entire system. This is not the case for existing approaches to multiphase semantic segmentation. For instance, for electrode segmentation using embodiments, if four previously-adapted transformers (i.e., corresponding to four respective target materials) are used and a fifth material is identified in scans that requires segmentation, only two components may need to be trained: a specialized transformer for the fifth material and a final combiner model, e.g., a U-Net model, that combines individual material segmentations—no retraining of the four previously-adapted transformers may be necessary.

As an additional example, materials in a real-world object that are initially determined to be of interest may each be assigned to separate transformer models, while all remaining materials may be grouped together under a single transformer. If one of the remaining materials is subsequently determined to be of interest as well, that material can easily be uncoupled from the others and a further transformer adapted for the material. A new transformer may also be trained for the group of remaining materials that no longer includes the uncoupled material. Including a new combiner model that is trained to integrate inputs from the (i) the original separate transformers, (ii) the further transformer for the uncoupled material, and (iii) the new transformer for the remaining grouped materials, a total number of additional components to be trained may be three.

A similar process to the preceding example may take place when a scientific need to distinguish between materials in certain regions in an image or between certain areas in an image does not arise until after an initial analysis has been conducted.

In this way, as shown in the above examples, embodiments allow a computational cost (e.g., several hours) of adapting transformer(s) and/or a combiner model to be deferred until a time when material(s) of interest are identified.

Further, as yet another example advantage, embodiments are flexible in terms of user prompting. Because embodiments may leverage a transformer model such as a large-scale ViT model, embodiments can be trained to accept user prompts to improve segmentation performance. These prompts may include manual user clicking on specific materials or rough outlines of materials. This may be especially useful for materials that are tough to segment for AI or ML, but are easily identifiable by domain experts. Embodiments can enable user prompting for all materials, some materials, or no materials. This may be unique to embodiments that leverage general transformers, allowing for superior performance compared to conventional semantic segmentation methods.

An example advantage of leveraging general transformers is that embodiments can be updated with new models as they are developed. For instance, if a new version of SAM is released that is trained on a larger set of images and provides better performance, the architecture of embodiments can be updated to use the new pre-trained general transformer. Thus, as advancements in general instance segmentation models are made, there will be downstream improvements in segmentation quality for embodiments.

Computer Support

Embodiments can be implemented in existing software and computer-aided design and computer-aided engineering platforms. For instance, embodiments can be implemented using features and functionalities of 3DS BIOVIA® software, including the Pipeline Pilot® application, among other examples.

Figure 6:
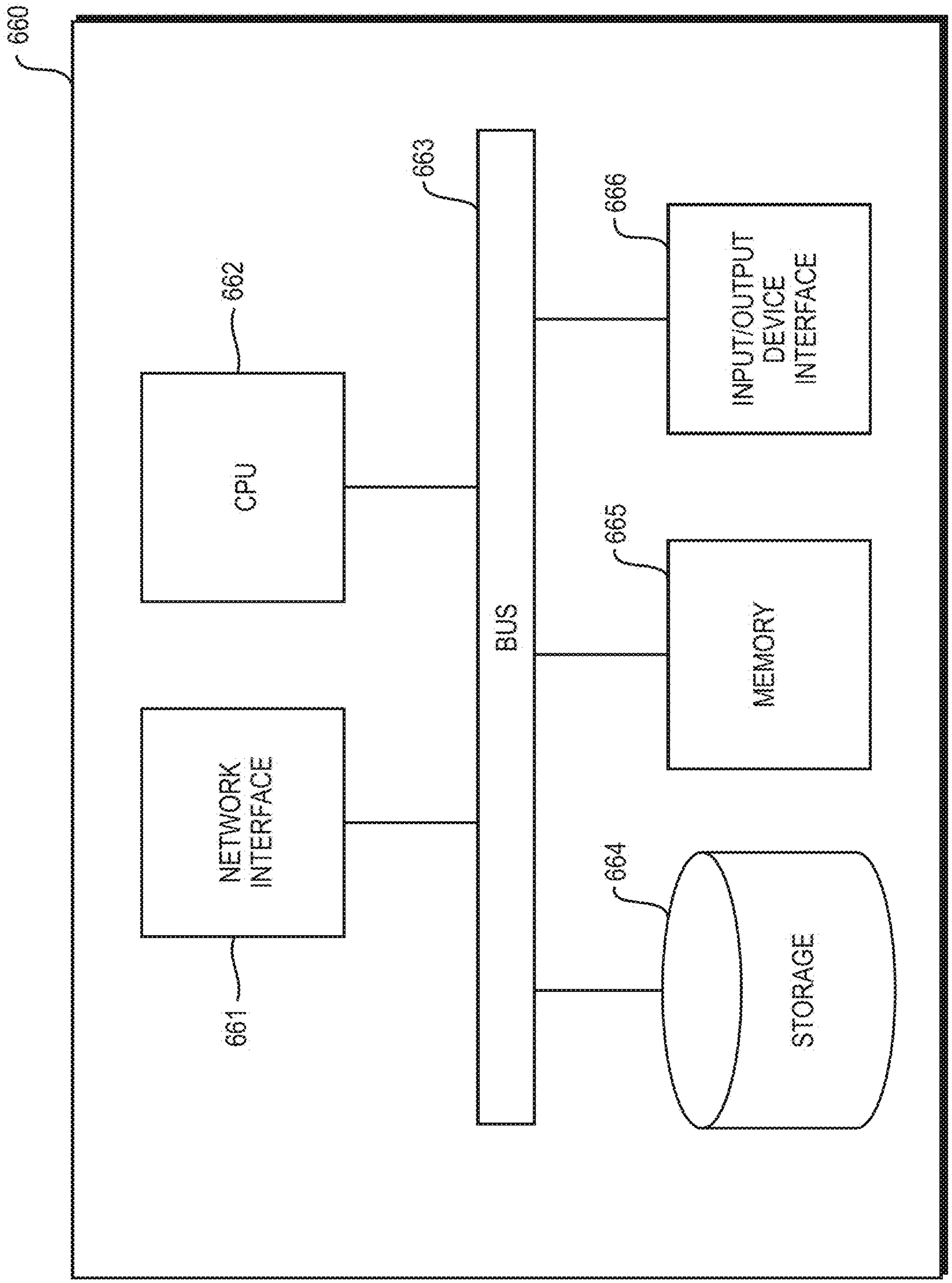
FIG. 6 is a simplified block diagram of a computer system for determining semantic segmentation of real-world objects according to an embodiment.

FIG. 6 is a simplified block diagram of a computer-based system 660 that may be used to determine semantic segmentation of real-world objects according to any variety of the embodiments of the present invention described herein. The system 660 comprises a bus 663. The bus 663 serves as an interconnect between the various components of the system 660. Connected to the bus 663 is an input/output device interface 666 for connecting various input and output devices such as a keyboard, mouse, touch screen, display, speakers, etc. to the system 660. A CPU 662 is connected to the bus 663 and provides for the execution of computer instructions. Memory 665 provides volatile storage for data used for carrying out computer instructions. Storage 664 provides non-volatile storage for software instructions, such as an operating system (not shown). The system 660 also comprises a network interface 661 for connecting to any variety of networks known in the art, including wide area networks (WANs) and local area networks (LANs).

It should be understood that the example embodiments described herein may be implemented in many different ways. In some instances, the various methods and machines described herein may each be implemented by a physical, virtual, or hybrid general purpose computer, such as the computer system 660, or a computer network environment such as the computer environment 770, described hereinbelow in relation to FIG. 7. The computer system 660 may be transformed into the machines that execute the methods described herein, for example, by loading software instructions implementing method 100 into either memory 665 or non-volatile storage 664 for execution by the CPU 662. One of ordinary skill in the art should further understand that the system 660 and its various components may be configured to carry out any embodiments or combination of embodiments described herein. Further, the system 660 may implement the various embodiments described herein utilizing any combination of hardware, software, and firmware modules operatively coupled, internally, or externally, to the system 660.

Figure 7:
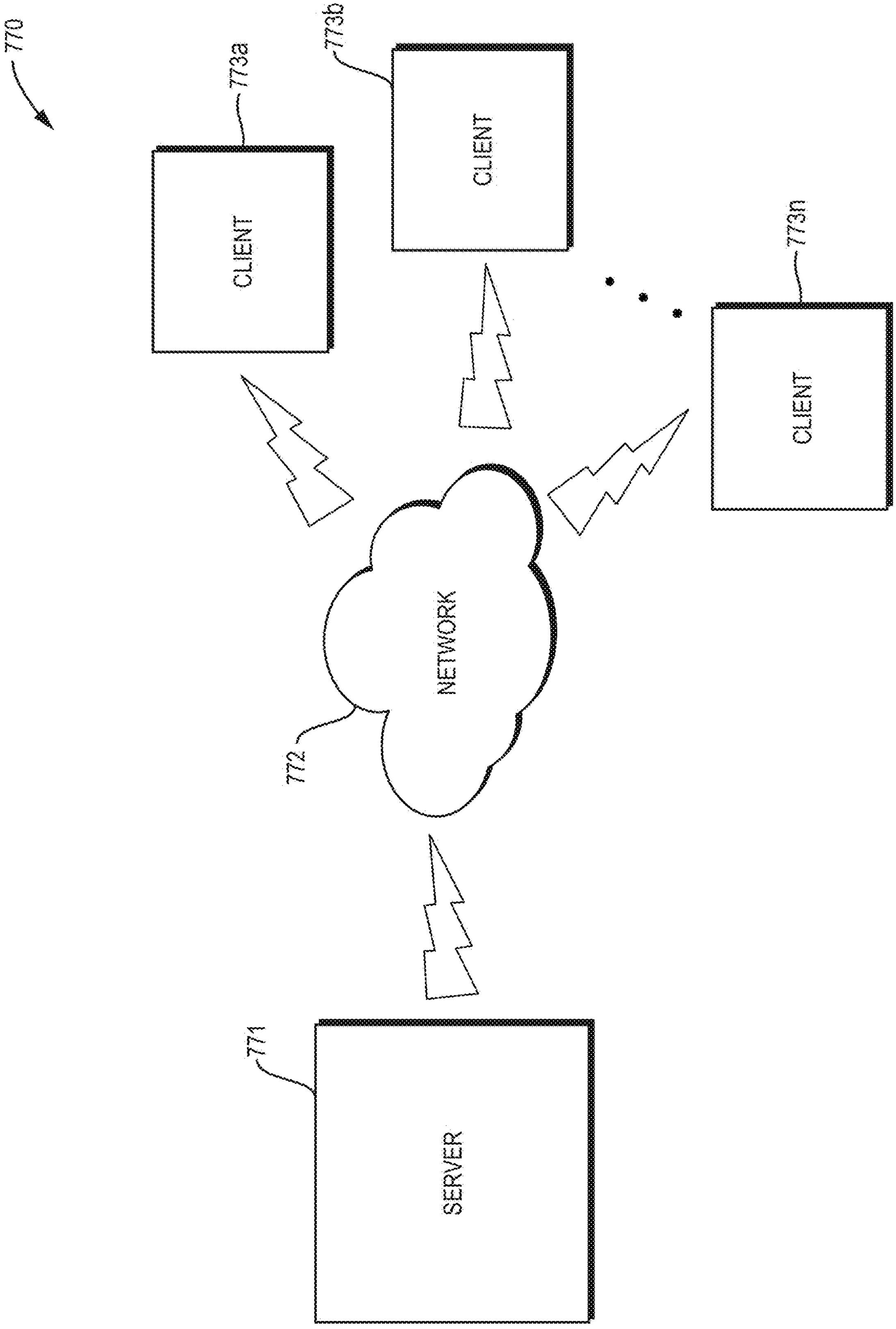
FIG. 7 is a simplified block diagram of a computer network environment in which embodiments of the present invention may be implemented.

FIG. 7 illustrates a computer network environment 770 in which embodiments of the present invention may be implemented. In the computer network environment 770, the server 771 is linked through the communications network 772 to the clients 773*a-n*. The environment 770 may be used to allow the clients 773*a-n*, alone or in combination with the server 771, to execute any of the embodiments described herein. For non-limiting example, computer network environment 770 provides cloud computing embodiments, software as a service (SaaS) embodiments, and the like.

Embodiments or aspects thereof may be implemented in the form of hardware, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus, the data processors described herein are intended for purposes of illustration only and not as a limitation of the embodiments.

The teachings of all patents, published applications, and references cited herein are incorporated by reference in their entirety.

While example embodiments have been particularly shown and described, it will be understood by those skilled in the art that various changes in form and details may be made therein without departing from the scope of the embodiments encompassed by the appended claims.

REFERENCES

[1] Su, Z. et al., "Artificial neural network approach for multiphase segmentation of battery electrode nano-CT images," npj Computational Materials, 8, 30 (2022).

[2] Müller, S. et al., "Deep learning-based segmentation of lithium-ion battery microstructures enhanced by artificially generated electrodes," Nature Communications, 12, 6205 (2021).

[3] Wang, G. et al., "Self-Augmentation with Dual-Cycle Constraint for Unsupervised Image-to-Image Generation," 2021 IEEE 33rd International Conference on Tools with Artificial Intelligence (ICTAI), Washington, DC, USA, 2021, pp. 886-890, doi: 10.1109/ICTAI52525.2021.00142.

[4] Kirillov, A. et al., "Segment anything," arXiv preprint arXiv: 2304.02643 (2023).

[5] Lu, X. et al., "3D microstructure design of lithium-ion battery electrodes assisted by X-ray nano-computed tomography and modelling," Nature Communications, 11, 2079 (2020).

[6] Wu, J., et al., "Medical SAM Adapter: Adapting Segment Anything Model for Medical Image Segmentation," arXiv preprint arXiv: 2304.12620v7 (2023).

[7] Boeck, H., "GitHub-hendrikboeck/simple-ct-sim."

[8] W. van Aarle, et al., "Fast and Flexible X-ray Tomography Using the ASTRA Toolbox," Optics Express, 24 (22), 25129-25147 (2016).

[9] W. van Aarle, et al., "The ASTRA Toolbox: A platform for advanced algorithm development in electron tomography," Ultramicroscopy, 157, 35-47 (2015).

What is claimed is:

1. A computer-implemented method for determining semantic segmentation of real-world objects, the computer-implemented method comprising:

obtaining an image of a real-world object;

processing the obtained image using a plurality of vision transformer (ViT) models to generate a plurality of segmentation masks, each ViT model being configured to output a respective segmentation mask corresponding to a respective target material; and using a neural network combiner model, generating a multiphase semantic segmentation mask based on the plurality of segmentation masks, the neural network combiner model trained to integrate outputs of the plurality of ViT models, thereby determining semantic segmentation of the real-world object.

2. The computer-implemented method of claim 1, further comprising:

adapting a given ViT model of the plurality of ViT models based on a plurality of training data pairs, each of the plurality of training data pairs including a raw training image and an annotated training image, the raw training image and the annotated training image each including indications of at least one target material.

3. The computer-implemented method of claim 2, wherein the adapting includes:

configuring the given ViT model with one or more of: (i) an encoding convolutional layer, (ii) a rectified linear unit (ReLU) convolutional layer, and (iii) a decoding convolutional layer.

4. The computer-implemented method of claim 2, wherein the adapting is configured with at least one of: (i) an epoch count between 100 and 50,000, (ii) a batch size between 5 and 100, and (iii) a learning rate between 0.5 and 0.00001.

5. The computer-implemented method of claim 2, further comprising:

identifying a plurality of structures in annotated training images of the plurality of training data pairs, each of the plurality of structures corresponding to a given target material;

based on the identified plurality of structures, determining a distribution of at least one metric;

generating a plurality of synthetic structures based on the determined distribution of the at least one metric;

translating the generated plurality of synthetic structures into a corresponding plurality of synthetic segmentation masks; and based on the plurality of synthetic segmentation masks, generating a plurality of synthetic training images.

6. The computer-implemented method of claim 5, wherein each annotation in the annotated training images is an ellipse and each of the identified plurality of structures corresponds to a respective ellipse, and wherein the at least one metric includes at least one of: (i) an ellipse major axis size, (ii) an ellipse minor axis size, and (iii) an ellipse axis angle.

7. The computer-implemented method of claim 5, wherein the translating uses a cycle-consistent generative adversarial network (GAN) model.

8. The computer-implemented method of claim 7, further comprising:

training the cycle-consistent GAN model with at least one of: (i) an epoch count between 50 and 10,000, (ii) a batch size between 5 and 50, and (iii) a learning rate between 0.5 and 0.00001.

9. The computer-implemented method of claim 5, further comprising:

determining a structural similarity index measure (SSIM) based on (i) the generated plurality of synthetic training images and (ii) raw training images of the plurality of training data pairs.

10. The computer-implemented method of claim 1, further comprising:

training the neural network combiner model based on a plurality of training data tuples, each of the plurality of training data tuples including a raw training image and respective outputs of the plurality of ViT models, the respective outputs being generated by the plurality of ViT models based on the raw training image.

11. The computer-implemented method of claim 10, wherein the training is configured with at least one of: (i) an epoch count between 50 and 1,000, (ii) a batch size between 5 and 20, and (iii) a learning rate between 0.5 and 0.00001.

12. The computer-implemented method of claim 1, wherein the neural network combiner model includes at least one skip connection between corresponding layers of the neural network combiner model.

13. The computer-implemented method of claim 1, wherein the neural network combiner model includes an encoder-decoder module.

14. The computer-implemented method of claim 1, wherein a given respective target material is pore, silicon, carbon black-binder (CBD), or graphite.

15. The computer-implemented method of claim 1, wherein at least one of the plurality of ViT models is a Segment Anything Model (SAM) or a ViT-Huge (ViT-H) model.

16. The computer-implemented method of claim 1, wherein the neural network combiner model is a U-Net model.

17. The computer-implemented method of claim 1, wherein the real-world object is an electrode.

18. The computer-implemented method of claim 1, further comprising:

receiving an indication of interest from a user, the indication of interest corresponding to at least one of (i) a region of the obtained image and (ii) one or more materials in the obtained image; and wherein generating the plurality of segmentation masks is further based on the received indication of interest.

19. A computer-based system for determining semantic segmentation of real-world objects, the system comprising:

a processor; and a memory with computer code instructions stored thereon, the processor and the memory, with the computer code instructions, being configured to cause the system to:

obtain an image of a real-world object;

process the obtained image using a plurality of vision transformer (ViT) models to generate a plurality of segmentation masks, wherein each ViT model is configured to output a respective segmentation mask corresponding to a respective target material; and using a neural network combiner model, generate a multiphase semantic segmentation mask based on the plurality of segmentation masks, the neural network combiner model trained to integrate outputs of the plurality of ViT models, thereby determining semantic segmentation of the real-world object.

20. A non-transitory computer program product for determining semantic segmentation of real-world objects, the computer program product executed by a server in communication across a network with one or more clients and comprising:

a computer-readable medium, the computer readable medium comprising program instructions, which, when executed by one or more processors, cause the one or more processors to:

obtain an image of a real-world object;

process the obtained image using a plurality of vision transformer (ViT) models to generate a plurality of segmentation masks, wherein each ViT model is configured to output a respective segmentation mask corresponding to a respective target material; and using a neural network combiner model, generate a multiphase semantic segmentation mask based on the plurality of segmentation masks, the neural network combiner model trained to integrate outputs of the plurality of ViT models, thereby determining semantic segmentation of the real-world object.

* * * * *